United States Patent
Young et al.

(10) Patent No.: US 9,982,728 B2
(45) Date of Patent: May 29, 2018

(54) SYSTEM AND METHOD FOR AUXILIARY CLUTCH FAILURE DETECTION

(71) Applicant: General Electric Company, Schenectady, NY (US)

(72) Inventors: Henry Todd Young, Erie, PA (US); Jason Daniel Kuttenkuler, Erie, PA (US); Jeffrey John Wolff, Lawrence Park, PA (US); Aaron Craig Mellinger, San Diego, CA (US)

(73) Assignee: General Electric Company, Schenectady, NY (US)

( * ) Notice: Subject to any disclaimer, the term of this patent is extended or adjusted under 35 U.S.C. 154(b) by 305 days.

(21) Appl. No.: 14/850,981

(22) Filed: Sep. 11, 2015

(65) Prior Publication Data

US 2016/0116006 A1     Apr. 28, 2016

Related U.S. Application Data

(60) Provisional application No. 62/067,417, filed on Oct. 22, 2014.

(51) Int. Cl.
*F16D 48/06*     (2006.01)
*F16D 48/10*     (2006.01)
*G07C 5/08*     (2006.01)

(52) U.S. Cl.
CPC ............. *F16D 48/10* (2013.01); *G07C 5/085* (2013.01)

(58) Field of Classification Search
CPC ................. F16D 48/06; F16D 48/10; F16D 2500/10418; F16D 2500/5023; F16D 2500/5041; F16D 2500/5108
See application file for complete search history.

(56) References Cited

U.S. PATENT DOCUMENTS

| | | | |
|---|---|---|---|
| 4,479,532 A | 10/1984 | Watanabe | |
| 4,651,922 A | 3/1987 | Noba | |
| 5,667,045 A | 9/1997 | Cummings | |
| 5,937,979 A | 8/1999 | Cummings | |
| 6,029,784 A * | 2/2000 | Grass | F16D 48/06 192/3.55 |
| 7,184,268 B2 | 2/2007 | Espinoza-Ibarra | |
| 7,488,271 B2 | 2/2009 | Inoue | |
| 7,866,959 B2 | 1/2011 | Barsun | |
| 8,113,988 B2 * | 2/2012 | Foster | B60K 6/365 477/125 |
| 2004/0223851 A1 | 11/2004 | Shiozaki | |
| 2013/0098730 A1 * | 4/2013 | Danciu | B60K 25/02 192/89.28 |

* cited by examiner

*Primary Examiner* — Edwin A Young
(74) *Attorney, Agent, or Firm* — GE Global Patent Operation; John A. Kramer (57) ABSTRACT

A system and method for auxiliary clutch failure detection determines a difference between a first output power of a powered system when a clutch system is controlled to engage and drive a load at a first output of the load and a second output power of the powered system when the clutch system is controlled to drive the load at a larger, second output. A control signal indicative of clutch failure is generated responsive to the difference being less than a designated threshold. The control signal may be used to implement one or more remedial actions.

20 Claims, 6 Drawing Sheets

SYSTEM AND METHOD FOR AUXILIARY CLUTCH FAILURE DETECTION

CROSS-REFERENCE TO RELATED APPLICATIONS

This application claims priority to U.S. Provisional Application No. 62/067,417, which was filed 22 Oct. 2014, and the entire disclosure of which is incorporated herein by reference.

FIELD

Embodiments relate to vehicles and other powered systems with auxiliary clutches. Other embodiments relate to auxiliary clutch diagnostics and associated control

BACKGROUND

Vehicles and other powered systems may include auxiliary clutches for selectively driving auxiliary loads. "Auxiliary clutch" refers to a clutch other than one for selectively engaging an engine or other prime mover of a powered system with a driven load to move the powered system (in the case of the powered system being a vehicle) or generate electricity (in the case of the powered system being a generator). For example, some vehicles (e.g., tractor trailers, haulage trucks and other mining vehicles, rail vehicles, automobiles, and so on) use a radiator fan located in the front of the engine as a heat exchange mechanism. The radiator fan is coupled to the engine mechanically and is driven at a fixed speed ratio, typically using a belt or drive shaft. The radiator fan cools the radiator, which transfers engine heat to the external environment. Because a percentage of fuel is burned to power the radiator fan, a clutch (e.g., variable hydraulic clutch) is used in some powered systems to allow the fan to be run at less than full output when full cooling is not required. However, clutch systems may be configured so that if the clutch fails, the fan is driven at full output only, that is, the fan is either off or driven at full output. This results in a lower fuel efficiency level than would be case had the clutch not failed, until the failed clutch is identified, which may not occur until vehicle overhaul.

BRIEF DESCRIPTION

In an embodiment, a system comprises a controller configured for operable coupling with a clutch system of a powered system. The clutch system includes a clutch and a load driven by the clutch. The controller is further configured to determine a difference between a first output power of the powered system when the clutch system is controlled to drive the load at a non-zero intermediate output and a second output power of the powered system when the clutch system is controlled to drive the load at a maximum output, the intermediate output being less than the maximum output, and to generate a control signal indicative of clutch failure responsive to the difference being less than a designated threshold.

For example, in another embodiment, a system comprises a vehicle having a clutch system with a radiator fan and a hydraulic clutch configured to drive the radiator fan. The clutch system is configured for the hydraulic clutch to fail to a full on mode of operation. The system further comprises a controller configured for operable coupling with the clutch system. The controller is further configured to determine a difference between a first output power of the vehicle when the clutch system is controlled to drive the radiator fan at a non-zero intermediate output and a second output power of the vehicle when the clutch system is controlled to drive the radiator fan at a maximum output, the intermediate output being less than the maximum output, and to generate a control signal indicative of clutch failure responsive to the difference being less than a designated threshold.

In one embodiment, a system (e.g., a system for auxiliary clutch failure detection) includes a controller configured for operable coupling with a clutch system of a powered system. The clutch system has a clutch and a load driven by the clutch. The controller is configured to determine a difference between a first output power of the powered system when the clutch system is controlled to engage and drive the load at a first output of the load and a second output power of the powered system when the clutch system is controlled to drive the load at a larger, second output. The controller is configured to generate a control signal indicative of clutch failure responsive to the difference being less than a designated threshold.

In another embodiment, a method (e.g., for detecting auxiliary clutch failure) includes measuring a power output of an engine with a power sensor. The engine is configured to drive a load of the powered system during a time period that a clutch system is engaged with the load. The method also includes determining that the power output of the engine is at or above a designated, non-zero output for at least a designated, non-zero time period and, responsive to determining that the power output is at or above the designated, non-zero output for at least the designated, non-zero time period, monitoring the power output of the engine for one or more decreases in the power output. The method also includes identifying the clutch system as being in a failure mode responsive to the power output of the engine not decreasing by at least a designated threshold amount.

In another embodiment, another method (e.g., for detecting failure of an auxiliary clutch fan) includes directing a load of a powered system to operate at or below a first designated output. The powered system includes an engine configured to drive the load during a time period that a clutch system of the powered system is engaged with the load. The method also includes measuring a power output of the engine with a power sensor while the load is operating at or below the first designated output, directing the load of the powered system to operate at or above a larger, second designated output, measuring the power output of the engine while the load is operating at or above the second designated output, and identifying the clutch system as being in a failure mode based on a difference between the power output of the engine during operation of the load at or below the first designated output and the power output of the engine during operation of the load at or above the second designated output.

DESCRIPTION OF FIGURES

In the figures and specification, like parts are given corresponding numbers.

DETAILED DESCRIPTION

In an embodiment, a system comprises a controller configured for operable coupling with a clutch system of a powered system. The clutch system includes a clutch (e.g., auxiliary clutch) and a load driven by the clutch. For example, the powered system may be a vehicle, the clutch may be a hydraulic clutch, and the load may be a radiator fan or other fan of the vehicle. The clutch system is configured for the hydraulic clutch to fail to a full on mode of operation. That is, the hydraulic clutch is configured for normal operation to drive the fan at a maximum output, at zero output (turned off), and at one or more intermediate outputs between maximum output and zero output (e.g., full variable percentage of maximum output, or steps such as 50% or 25% of maximum output). But, when in a failure or stuck mode, the hydraulic clutch only drives the fan at the maximum output (and when turned off, zero output), and not at any intermediate outputs. The controller is further configured to determine a difference between a first output power of the vehicle (e.g., vehicle horsepower) when the clutch system is controlled to drive the fan at the intermediate output and a second output power of the vehicle when the clutch system is controlled to drive the fan at a maximum output.

The output powers are a function (in part) of the actual output of the fan. When the fan is actually driven by the clutch at maximum output, the vehicle output power will be less than if the fan is actually driven at an intermediate output. Because the engine or prime mover of the vehicle powers the fan, engaging the clutch so that the fan is operating at a maximum output decreases the output power of the vehicle relative to engaging the clutch so that the fan is operating at a reduced output.

Thus, if the clutch has not failed, then the difference between the two vehicle power outputs is relatively large (vehicle output power when fan is actually driven at the intermediate level less vehicle output power when fan is actually driven at the maximum level), whereas if the clutch has failed to full on, then the difference between the two vehicle power outputs is relatively small (vehicle output power when fan is actually driven at the maximum output despite the system commanding operation at the intermediate level, less vehicle output power when fan is actually driven at the maximum output). The difference between the power outputs can be examined to determine if the clutch is in a failure or stuck mode where the fan is stuck in a maximum output state.

The controller is further configured to generate a control signal indicative of clutch failure responsive to the difference being less than a designated threshold, which is selected to be between the relatively large difference (between vehicle power outputs) when the clutch is operating normally and the relatively small difference when the clutch fails. This control signal can indicate that the clutch is in a failure or stuck state, and can be used to implement one or more remedial actions, as described below.

Figure 1:
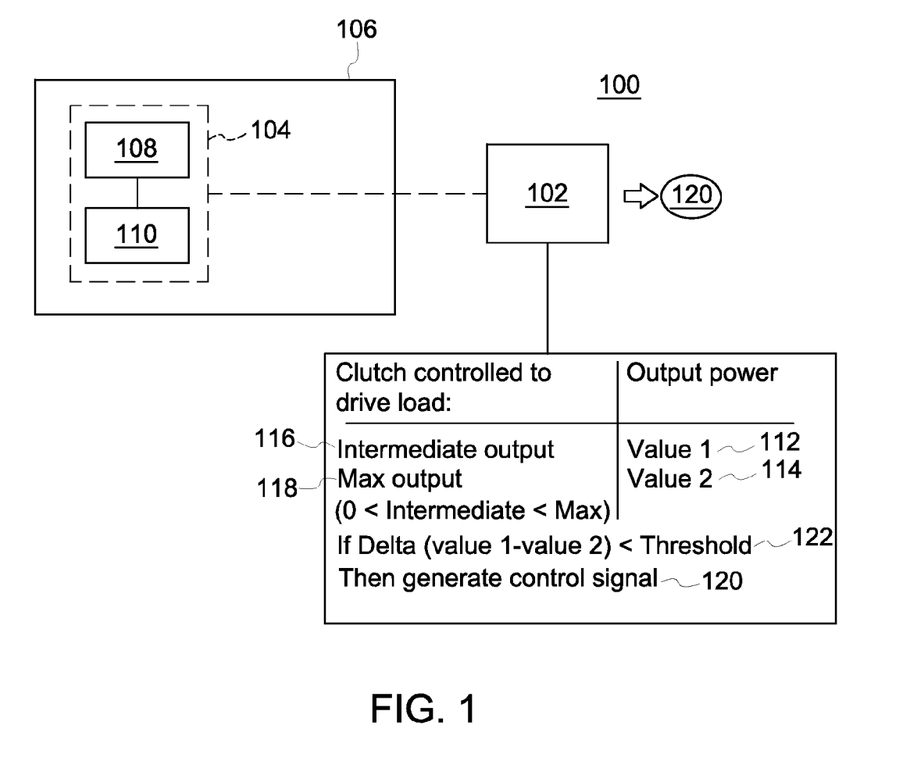
FIG. 1 is a schematic diagram of a system for auxiliary clutch failure detection, according to an embodiment.

FIG. 1 illustrates an embodiment of a monitoring system 100, which comprises a controller 102 that is configured for operable coupling with a clutch system 104 of a powered system 106 (e.g., vehicle or stationary generator). The clutch system 104 includes a clutch 108 (e.g., hydraulic clutch) and a load 110 (e.g., radiator fan, blower fan, or other fan) driven by an engine or prime mover of the powered system 106 via the clutch. The controller is further configured to determine a difference between a first output power 112 of the powered system when the clutch system is controlled to drive the load at a non-zero intermediate output 116 (also referred to herein as a lower designated output) and a second output power 114 of the powered system when the clutch system is controlled to drive the load at a maximum output 118 (also referred to herein as a larger designated output), the intermediate output being less than the maximum output. The controller is configured to generate a control signal 120 indicative of clutch failure responsive to the difference being less than a designated threshold 122 or designated amount (e.g., designated amount 712 shown in FIG. 7). The clutch system may be configured for the clutch to fail to a full on mode of operation.

In one aspect, the controller may only generate the control signal if the powered system is operating in a mode that does not require the load to be driven at the maximum output due to operational conditions of the powered system. For example, the controller may not generate the control signal, even if the difference between output powers does not exceed the threshold, if the powered system is operating in a mode in which the load is not operated at a maximum output. This situation may occur when the powered system is operating in conditions where the fan is not required to operate to cool the engine, such as in locations with cold ambient temperatures, time periods in which the temperature of the engine is relatively cool (e.g., such that the fan is not needed to cool the engine), etc.

Figure 2:
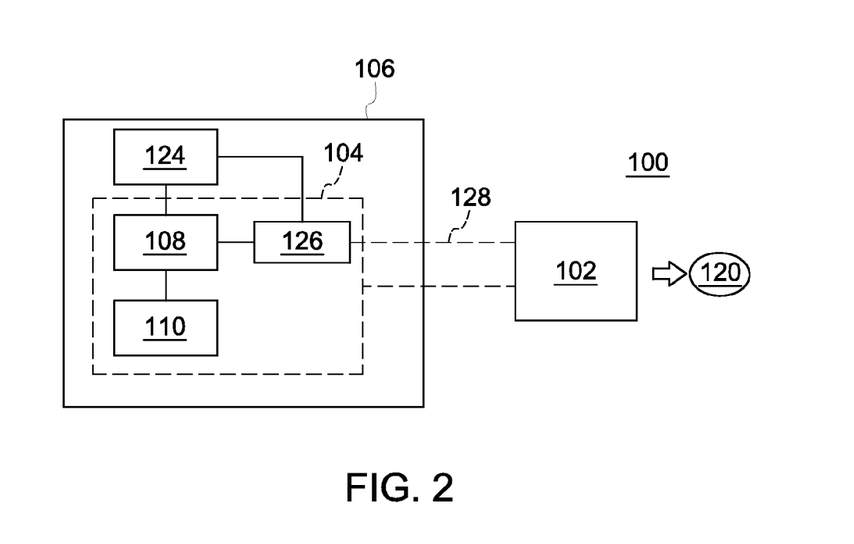
FIG. 2 is a schematic diagram of a system for auxiliary clutch failure detection, according to an embodiment.

With reference to FIG. 2, the powered system 106 may include an engine or other prime mover 124 that drives the clutch 108. The powered system 106 may also include a control unit 126 that is configured to control the clutch and/or engine. The powered systems shown herein may represent the engines described herein. The controller 102 may be configured for operable coupling with the control unit 126 to receive information from the control unit 126 (e.g., over a CAN network or other communication path 128) about the how the clutch is currently commanded (e.g., whether the clutch is being controlled to drive the load at the maximum output or whether the clutch is being controlled to drive the load at the intermediate output).

In an embodiment, the powered system 106 is a vehicle (e.g., mining haul truck), and the controller 102 is configured to determine the first output power as a first net power output of the vehicle (e.g., first net horsepower) when a throttle of the vehicle is fully applied and to determine the second output power as a second net power output of the vehicle. In one aspect, the throttle may be fully applied when the throttle is actuated to a position or setting that cannot be exceeded, such as when an operator of a vehicle depresses a throttle pedal fully to the ground. The second net power output of the vehicle may be determined when the throttle is not fully applied, but is applied at a non-zero setting or position. The net powers can refer to the amount of the power generated by the engine or prime mover of the vehicle that is used to power the fan. The controller may be configured for a pre-operational check test mode, where the controller is configured to instruct an operator of the vehicle (e.g., via an output device of the controller, such as a display, speaker, light, or the like), responsive to the operator requesting the test mode or otherwise, to fully apply the vehicle throttle. Fully applying the vehicle throttle can increase the output power of the engine of the vehicle.

The controller records a first stable net vehicle power output (e.g., horsepower) with the fan at its default (less than 100% maximum output) speed command. The controller then commands that the fan be operated at maximum output, and records a second net vehicle power output. The controller compares the difference between the two to the designated threshold (e.g., the designated amount 712 shown in FIG. 7). The designated threshold or amount can be based on ambient conditions and/or the default speed command. For example, the designated threshold or amount may be less for higher altitudes, hotter ambient temperatures, and/or slower default speeds of the fan than for lower altitudes, cooler ambient temperatures, and/or faster default speeds of the fan. If the difference is below the threshold, then the difference can indicate that the clutch is stuck such that the engine continues to drive the fan even when the fan is commanded to a reduced output. A control signal can be generated (e.g., to log a fault of the clutch, notify an operator of the vehicle, etc.).

In another embodiment of the system 100, the powered system is a vehicle (e.g., mining haul truck) and the load is a fan, and the controller is configured to periodically, on a regular scheduled basis (e.g., once per day or once per week): determine the first output power as a first net power output of the vehicle when a throttle of the vehicle is fully applied but maximum cooling by the fan is not required in the vehicle; after the first net power output is determined, to control the clutch system to drive the fan at the maximum output; and after the clutch system is controlled to drive the fan at the maximum output, to determine the second output power as a second net power output of the vehicle.

For example, the system 100 may be configured for real time monitoring for determining when the clutch has failed to 100% full operation only. In an embodiment, the controller 102 is configured for monitoring to occur when the vehicle is at 100% throttle command, but the thermal state of the vehicle does not require full cooling. It can be scheduled to run periodically, for example, once per day or once per week. When enabled, the controller records the steady-state net vehicle power output when the fan command is less than a given threshold. Once a good average vehicle output power is recorded, the controller sends a command to the engine (or control unit 126) to request full fan speed. Once full fan speed is commanded, the controller records another average steady-state net vehicle output power. The system looks for the difference between the output powers on clutch state change to exceed a minimum threshold, i.e., whether the difference is below the threshold. If the difference is below the threshold, then the control signal is generated (e.g., a fault is logged).

The control signal 102 may be configured to at least one of control a machine for automatically storing information about the clutch failure, control a machine for automatically alerting an operator of the powered system about the clutch failure, control a machine for automatically scheduling a maintenance operation on the powered system, or automatically control the powered system from a first mode of operation to a second, different mode of operation.

In another embodiment of the system, the controller 102 is configured to: determine the first output power as a first average over a first time interval and to determine the second output power as a second average over the first time interval or a second time internal; determine the difference a plurality of instances over a time period; and generate the control signal indicative of clutch failure responsive to none of the instances of the difference that are determined exceeding the designated threshold during the time period.

For example, the system may be configured for continuous monitoring at full vehicle (or other powered system) output power. Here, the controller 102 is configured to tracks maximum average net output power (e.g., horsepower). When full cooling is not needed, the fan clutch should be running at partial speed and net output power should be higher than when the clutch is running at full speed. The controller 102 is configured to track minimum and maximum output power (e.g., horsepower) averaged over an appropriate time interval (e.g., in the range of 30 seconds to 5 minutes). If the clutch is working properly the delta between the minimum and maximum should exceed the designated threshold (for example, 50 hp). If over a long enough time period the designated threshold is not exceeded, then a non-restrictive fault could be logged (or other means of notifying maintenance) to check the clutch. It may be the case that the controller 102 is configured for checking for clutch failure when the engine is in a state (e.g., cooled down after temporary shutdown for fueling or crew change) where full cooling is not needed on an initial full output power request.

The controller 102 may be configured to not generate the control signal based on various operational conditions which would prevent the fan clutch from cycling off. Some of these would be continuous high ambient temperature, vehicle cab air conditioning always on and the system configured for this to force the fan on. Likewise, clutch failure detection may not work in extremely cold ambient temperatures and may need to be disabled under such conditions.

If fan clutch commanded percent is available (e.g., from the control unit 126), this same feature can be modified so that the net power output at full fan and the net power output at fan<threshold are recorded vs. minimum and maximum. Every time they are both updated, a comparison could be made to evaluate the health of the fan.

Figure 3:
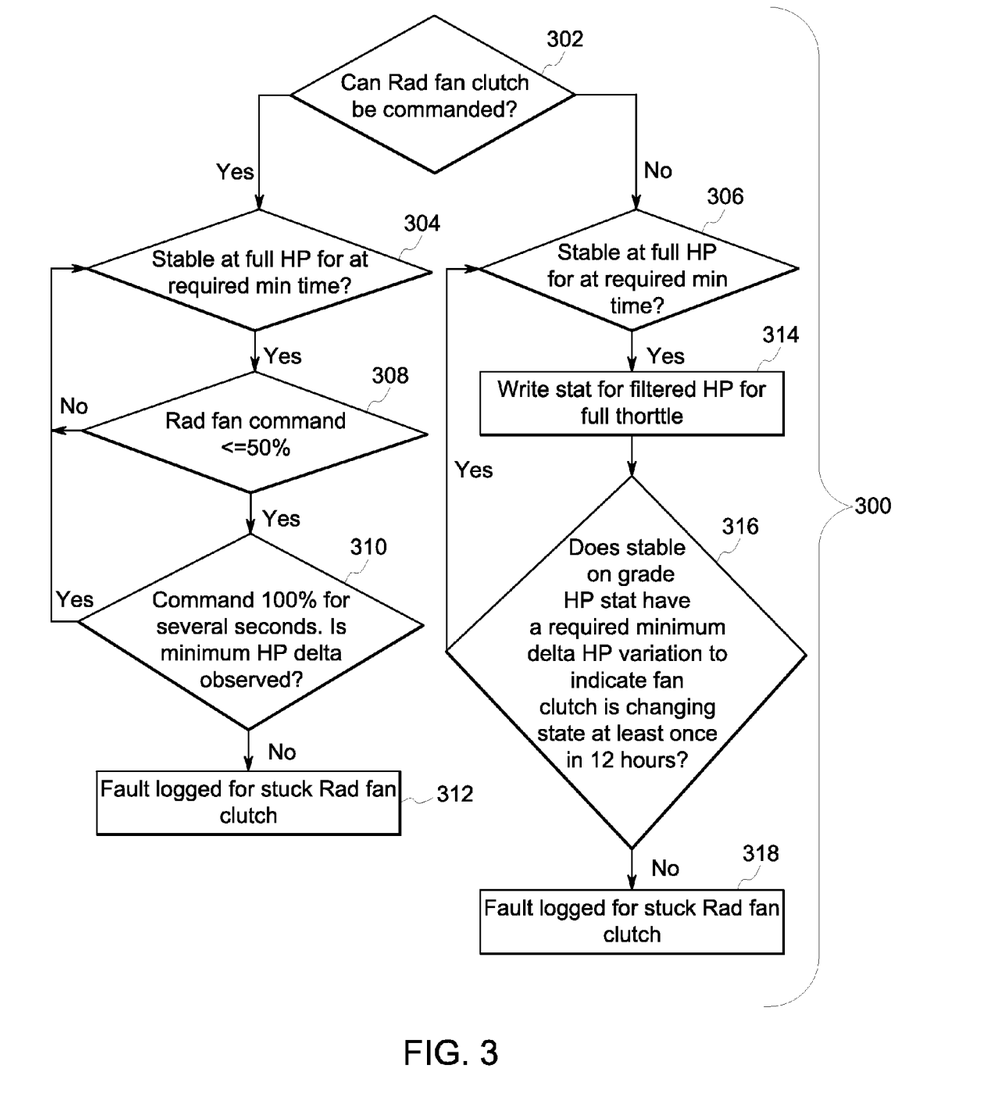
FIG. 3 is a flow chart of a method for auxiliary clutch failure detection, according to an embodiment.

FIG. 3 is a flow chart of a method 300 for auxiliary clutch failure detection, according to an embodiment. The method 300 can represent operations or steps of an algorithm performed by a controller (e.g., the controller 502 described below) under the direction of software or instructions that are hard-wired in the circuitry of the controller. At 302, a determination is made as to whether a radiator fan clutch can be controlled. For example, if the clutch can be manually engaged, then the clutch can be controlled. As a result, flow of the method 300 can proceed toward 304. If, however, the clutch cannot be manually engaged, then flow of the method 300 can proceed toward 306.

At 304, the engine output of the prime mover is monitored to determine when the output is stable (e.g., at or above a designated output) for at least a designated time period. For example, the controller can monitor power outputs of the prime mover to determine when the prime mover generates at least a designated power output threshold (e.g., in terms of horsepower or other units) for at least a designated, non-zero time period. Responsive to the prime mover producing a power output that exceeds the designated power output threshold for at least as long as the threshold time period, flow of the method 300 can proceed toward 308.

At 308, the load (e.g., a radiator fan) is directed to operate at or below a lower designated output (e.g., 50%). The lower designated output may be an output that is less than the maximum possible output of the load. If the load does not operate at or below the lower designated output, then flow of the method 300 can return toward 304. If the load does operate at or below the lower designated output, then the method 300 may proceed toward 310.

At 310, the load (e.g., a radiator fan) is directed to operate at or above a larger designated output. The larger designated output may be an output that is greater than the lower designated output. In one embodiment, the larger designated output is the maximum possible output of the load. The output of the prime mover can then be monitored. For example, the engine outputs of the prime mover (e.g., the horsepower or torque generated) after directing the load to operate at or above the larger designated output can be monitored and used to calculate one or more statistics, as described above. If the engine output decreases by at least a designated amount, then the failure of the engine outputs to decrease may indicate that the clutch is stuck in an engaged position. As a result, flow of the method 300 may proceed toward 312, which is described above. On the other hand, if the engine output does decrease by at least the threshold amount, then this change in the engine output may indicate that the clutch is not stuck in an engaged position. As a result, flow of the method 300 may return toward 304. Optionally, operation of the method 300 may terminate. At 312, a fault may be logged for a failed clutch. For example, a record may be made indicating that the clutch of the load is stuck. Alternatively, one or more other responsive or remedial actions may be implemented at 312, as described herein.

Returning to the description of the method 300 at 302, if the load can be manually controlled, then flow of the method 300 can proceed toward 306. At 306, the engine output of the prime mover is monitored to determine when the output is at or above the designated output for at least the designated time period. For example, the controller can monitor power outputs of the prime mover to determine once the prime mover generates at least a designated power output threshold (e.g., a designated amount of horsepower or torque) for at least a designated, non-zero time period. The designated thresholds of power and time period can be set so that the clutch system will automatically engage. For example, the designated power output threshold may be sufficiently large and the designated time period may be sufficiently long to ensure that the prime mover will heat up and cause the clutch system to automatically engage and cool the prime mover. Responsive to the prime mover producing a power output that exceeds the designated power output threshold for at least as long as the threshold time period, flow of the method 300 can proceed toward 314.

At 314, a statistic representative of a filtered output of the engine is created. For example, the engine outputs of the prime mover 524 (e.g., the horsepower or torque generated) during the time period before the clutch engages to activate the load can be used to calculate a statistic. In one aspect, this statistic can be calculated as an average, median, or other calculation of samples of the engine output. For example, if the engine output is measured once every thirty seconds (or another frequency), the statistic can be calculated as an average of the engine outputs generated by the prime mover during the designated time period described above. The statistic can be calculated as the average of the engine outputs that are sampled once every thirty seconds when a throttle of the prime mover is at or above a designated setting. For example, the statistic can be calculated as an average of the engine outputs that are sampled once every thirty seconds while the throttle of the prime mover is at a maximum setting (or another setting).

At 316, a determination is made as to whether the engine output decreases by at least a designated amount at least as often as a designated frequency. For example, the engine outputs are monitored in order to determine if the engine outputs decrease often enough to indicate that the clutch is not stuck in an engaged state. In one embodiment, a determination is made as to whether the statistic created at 314 indicates that, during travel of the prime mover on a grade, the statistic of the engine output decrease by at least a designated threshold (e.g., the minimum delta HP) to indicate that the clutch is changing state (e.g., between engaged and not engaged) at least once every twelve hours (or another time period). If the statistic is decreasing by at least the designated threshold, then the changing statistic can indicate that the clutch is operating properly to engage the clutch when needed and to disengage the clutch at other times. As a result, flow of the method 300 can return toward 306. If the statistic is not decreasing, then the statistic can indicate that the clutch is not operating properly, and may be stuck. As a result, flow of the method 300 can proceed toward 318.

At 318, a fault may be logged for a failed clutch. For example, a record may be made indicating that the clutch of the load is stuck. Alternatively, one or more other responsive or remedial actions may be implemented at 318, as described herein.

Figure 4:
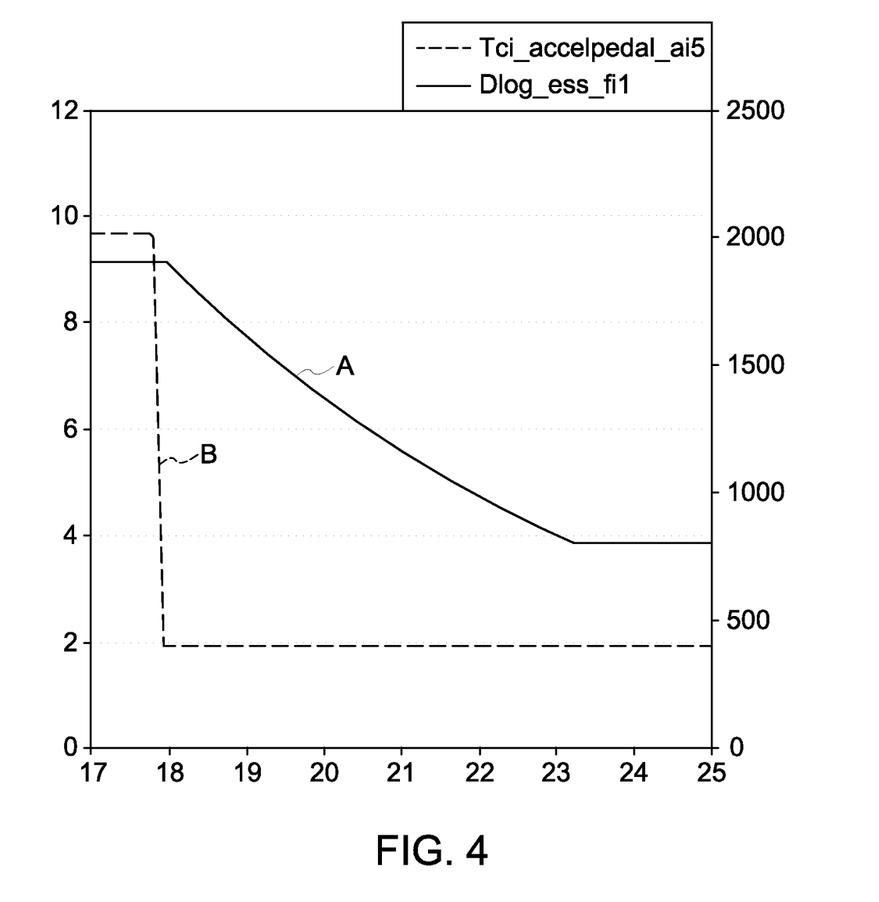
FIG. 4 is a graph showing engine coast down rates.

In another embodiment, a system is configured for a pre-operational fan clutch check when no clutch state information is available. In one aspect, the check is performed when the powered system is cool and the fan is not expected to be commanded to maximum output. Examples of parameters to verify include hydraulic temperature being cool (below a designated level), engine temperature is cool, oil temperature is cool, air conditioner in off position, and/or vehicle has been sitting idle for at least 5 minutes. If applicable, the powered system is put in rest to remove electrical loads (e.g., electrical load of an alternator to drive traction motors). Rated engine speed is commanded, and then idle engine speed is commanded. The coast down rate is evaluated to determine if fan clutch is failed full on. More specifically, if the fan is failed full on, the engine speed will lower much faster (see trace "B" in FIG. 4) than if the fan is at an intermediate output (see trace "A" in FIG. 4).

In another aspect of a pre-operational fan clutch check when no clutch state information is available, one or more of the same parameters as discussed immediately above are verified. The vehicle is run at full engine load box, as stabilized long enough for the controller 102 to capture average power output. The operator is commanded to initiate an input, such as switching on cab air conditioning to cause the fan to be commanded on full. The controller is configured to look for load drop when the operator commands the fan clutch to full.

Another embodiment relates to an engine shutdown ramp down check. This occurs at the end of vehicle operation. When the engine is shut off, engine speed is monitored. If the fan clutch is stuck on full, engine speed will come done much faster than if it is at a lower setting.

Figure 5:
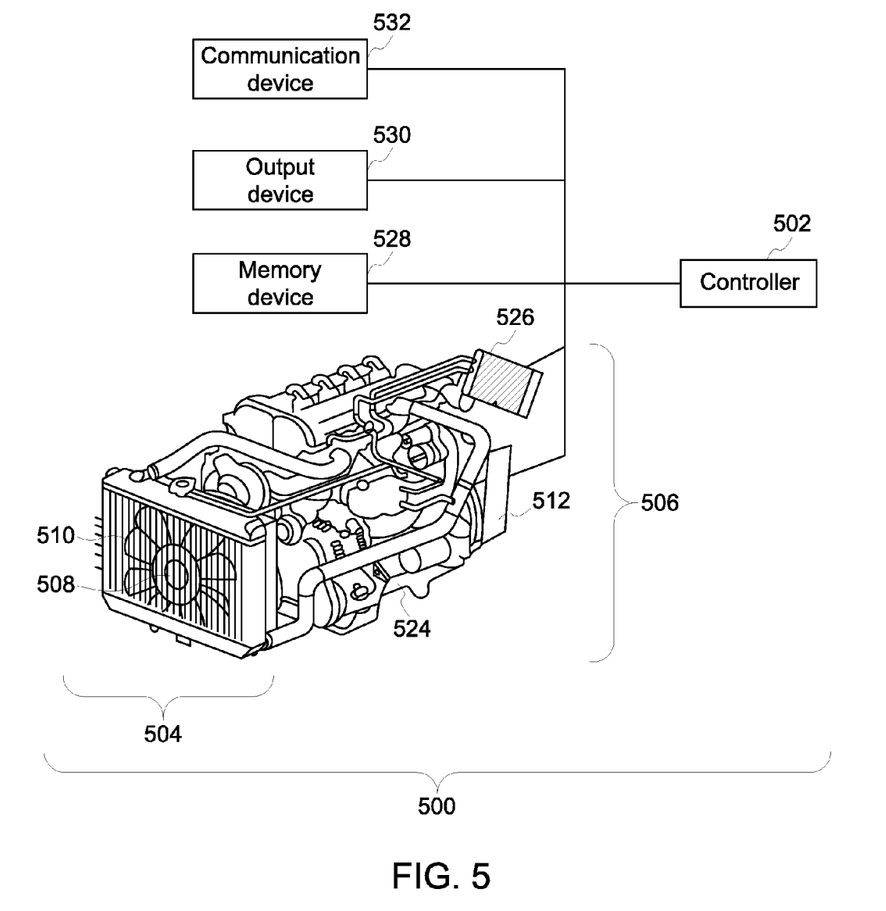
FIG. 5 illustrates one embodiment of a monitoring system.

FIG. 5 illustrates one embodiment of a monitoring system 500. The system 500 may be similar to the system 100 shown in FIG. 1 in that the systems 100, 500 can monitor clutch systems of powered systems. The system 500 includes a controller 502, which can represent the controller 102 and include hardware circuitry that includes and/or is connected with one or more processors (e.g., microprocessors, field programmable gate arrays, application specific integrated circuits, application specific instruction set processors, etc.). The controller 502 is operably coupled with a clutch system 504 of a powered system 506. The clutch system 504 can represent the clutch system 104 shown in FIG. 1, and can include a clutch 508 (e.g., the clutch 108 shown in FIG. 1) and a load 510 (e.g., the load 110 shown in FIG. 1). In the illustrated example, the load 510 is a radiator fan, but alternatively may include a blower fan or other fan. The powered system 506 includes an engine or prime mover 524 (e.g., the engine or prime mover 124 shown in FIG. 2) of a vehicle, but alternatively may represent the vehicle, a stationary generator, or other system that consumes a fuel to perform work (e.g., generate a power output). The powered system 506 may also include a control unit 526 that is configured to control the clutch 508 and/or prime mover 524. The control unit 526 can represent hardware circuitry that includes and/or is connected with one or more processors (e.g., microprocessors, field programmable gate arrays, application specific integrated circuits, application specific instruction set processors, etc.). The controller 502 may be communicatively coupled with the control unit 526 by one or more wired and/or wireless connections to allow the controller 502 to control operation of the clutch 508, load 510, and/or prime mover 524 via the control unit 526, as described herein. The control unit 526 can represent the control unit 126.

The controller 502 monitors power outputs of the powered system 506. The controller 502 may be communicatively coupled with a power sensor 512 by one or more wired and/or wireless connections. The power sensor 512 measures the power output of the prime mover 524 as torque or horsepower generated by the prime mover 524. In one embodiment, the power sensor 512 may be a dynamometer coupled with a shaft of the prime mover 524. The controller 502 can monitor the power outputs of the powered system 506 at different states of the clutch system 504 in order to determine whether the clutch 508 has failed (e.g., is stuck in a position that activates the load 510 such that at least some of the power output generated by the prime mover 524 is rotating the load 510).

Figure 6:
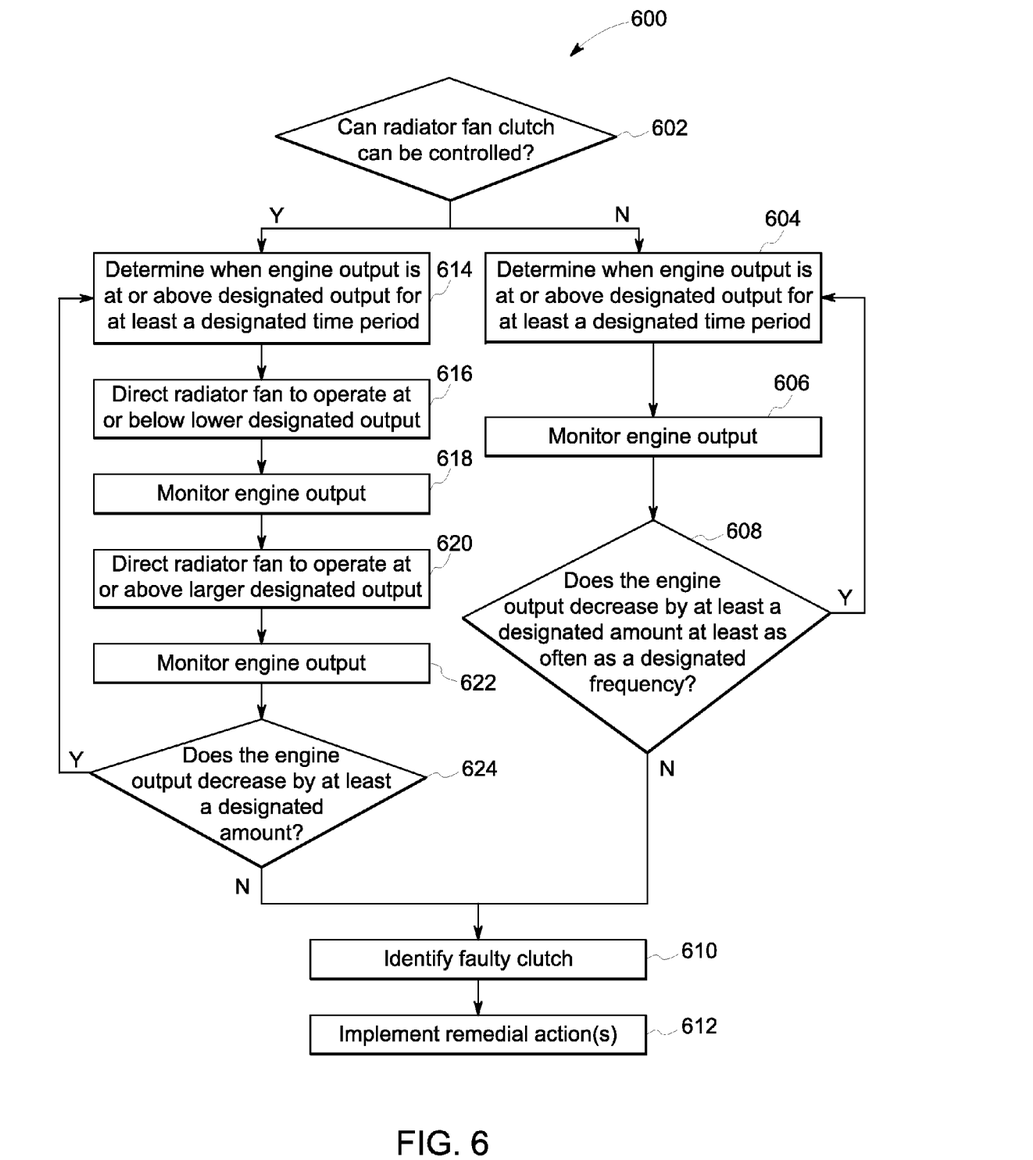
FIG. 6 illustrates a flowchart of one embodiment of a method for monitoring the clutch system shown in FIG. 5.

With continued reference to the system 500 shown in FIG. 5, FIG. 6 illustrates a flowchart of one embodiment of a method 600 for monitoring the clutch system 504 shown in FIG. 5. The method 600 can represent operations or steps of an algorithm performed by the controller 502 under the direction of software or instructions that are hard-wired in the circuitry of the controller 502. At 602, a determination is made as to whether a radiator fan clutch can be controlled. For example, in some clutch systems 504, the clutch 508 is automatically engaged or disengaged with the load 510 to respectively activate the load 510 (e.g., rotate with motion generated by the prime mover 524) or deactivate the load 510 (e.g., stop rotating with motion generated by the prime mover 524). The clutch 508 may automatically engage responsive to a temperature of the prime mover 524 exceeding a designated temperature threshold so that the load 510 begins drawing air to cool the prime mover 524. The clutch 508 may automatically disengage responsive to the temperature no longer exceeding the temperature threshold.

In other clutch systems 504, however, the clutch 508 may be manually engaged or disengaged from the load 510. Such a clutch 508 also may be automatically engaged or disengaged, but also may be able to be manually engaged or disengaged responsive to a user actuating an input device, such as a pedal, switch, button, or the like (not shown).

If the clutch system 504 is able to be manually controlled (e.g., able to be manually engaged or disengaged from the load 510, then flow of the method 600 may proceed to 614. On the other hand, if the clutch system 504 is not able to be manually controlled (e.g., during normal operation of the system 504, the clutch 508 automatically engages or disengages), then flow of the method 600 can proceed to 604.

At 604, an engine output of the prime mover 524 is monitored to determine when the output is at or above a designated output for at least a designated time period. For example, the controller 502 can monitor power outputs of the prime mover 524 to determine once the prime mover 524 generates at least a designated power output threshold (e.g., a designated amount of horsepower or torque) for at least a designated, non-zero time period. The designated thresholds of power and time period can be set so that the clutch system 504 will automatically engage. For example, the designated power output threshold may be sufficiently large and the designated time period may be sufficiently long to ensure that the prime mover 524 will heat up and cause the clutch system 504 to automatically engage and cool the prime mover 524. Responsive to the prime mover 524 producing a power output that exceeds the designated power output threshold for at least as long as the threshold time period, flow of the method 600 can proceed toward 606.

In one embodiment, the controller 502 is configured to ensure that all available power that can be generated by the prime mover 524 is being output by the prime mover 524. The prime mover 524 may be manufactured or provided with an engine rating that defines or designates the maximum amount of power output (e.g., horsepower) that the prime mover 524 is able to generate. The engine rating can be the designated output described above such that the controller 502 determines at 604 whether the output of the prime mover 524 is equal to the engine rating of the prime mover 524 (e.g., the output and the rating are equivalent or within a measurement error, such as 0.5%, 1%, 2%, 5%, etc.) for at least the designated time period. In one aspect, flow of the method 600 does not proceed beyond 604 unless and until the engine output is at or above the designated output for at least the designated time period.

In one embodiment, the power sensor 512 can measure a current load on the prime mover 524 and the controller 502 can determine how much load to add onto the prime mover 524 and/or how much load to remove from the prime mover 524 to cause the output of the prime mover 524 to be at the designated output (e.g., the engine rating). In one aspect, the controller 502 can determine the load to add onto or remove from the prime mover 524 by determining if the current load on the prime mover 524 is within a designated range. This range may extend from a lower load limit to an upper load limit. The lower load limit may represent a non-zero, smaller amount of load on the prime mover 524 that can be associated with the prime mover 524 being under loaded (e.g., the prime mover 524 is idling) and the upper load limit may represent a larger amount of load on the prime mover 524 that can bog down the prime mover 524 (e.g., cause the prime mover 524 to stall).

The controller 502 can determine if the power output is at or above the designated output. Optionally, the speed of the prime mover 524 can be examined in order to determine the power output of the prime mover 524. The sensor 512 can be a speed sensor, such as a tachometer, and load placed on the prime mover 524 is increased or decreased until a target speed of the prime mover 524 is achieved. The controller 502 can direct the prime mover 524 to operate at faster engine speeds (e.g., speeds at which the prime mover 524 rotates a shaft) until the prime mover 524 is operating at an upper designated engine speed. At that time, an electric load is placed on the powered system, such as by the controller 502 activating a load such as a cooling system (e.g., air conditioning system) or other electric load of the powered system, until the engine speed of the prime mover 524 decreases to a different, lower designated engine speed. The amount of electric load that is placed on the powered system before the engine speed decreases from the upper designated engine speed to the lower designated engine speed can represent the power output of the prime mover 524. For example, larger amounts of electric load that cause the decrease in engine speed can represent larger power outputs of the prime mover 524, while smaller amounts of electric load that cause this same decrease can represent smaller power outputs. The controller 502 and prime mover 524 can operate in a closed loop manner in order to monitor the power output of the prime mover 524.

At 606, the engine output of the prime mover 524 is monitored. For example, the engine outputs of the prime mover 524 (e.g., the horsepower or torque generated) during the time period before the clutch 508 engages to activate the load 510 can be used to calculate a statistic. In one aspect, this statistic can be calculated as an average, median, or other calculation of samples of the engine output. For example, if the engine output is measured once every thirty seconds (or another frequency), the statistic can be calculated as an average of the engine outputs generated by the prime mover 524 during the designated time period described above in connection with 604. The statistic can be calculated as the average of the engine outputs that are sampled once every thirty seconds when a throttle of the prime mover 524 is at or above a designated setting. For example, the statistic can be calculated as an average of the engine outputs that are sampled once every thirty seconds while the throttle of the prime mover 524 is at a maximum setting (or another setting).

The engine output can continue to be monitored and the statistic can continue to be calculated after the time period described above in connection with 604. For example, the engine outputs during the time period leading up to automatic engagement of the clutch 508 can be used to calculate a first statistic or first set of statistics for the prime mover 524, and the engine outputs following this time period can continue to be monitored and used to calculate a second statistic or second set of statistics. The engine outputs used to calculate the second statistic or second set of statistics can vary due to the prime mover 524 operating at different throttle settings.

At 608, a determination is made as to whether the engine output decreases by at least a designated amount at least as often as a designated frequency. For example, the engine outputs are monitored in order to determine if the engine outputs decrease often enough to indicate that the clutch 508 is not stuck in an engaged state.

Figure 7:
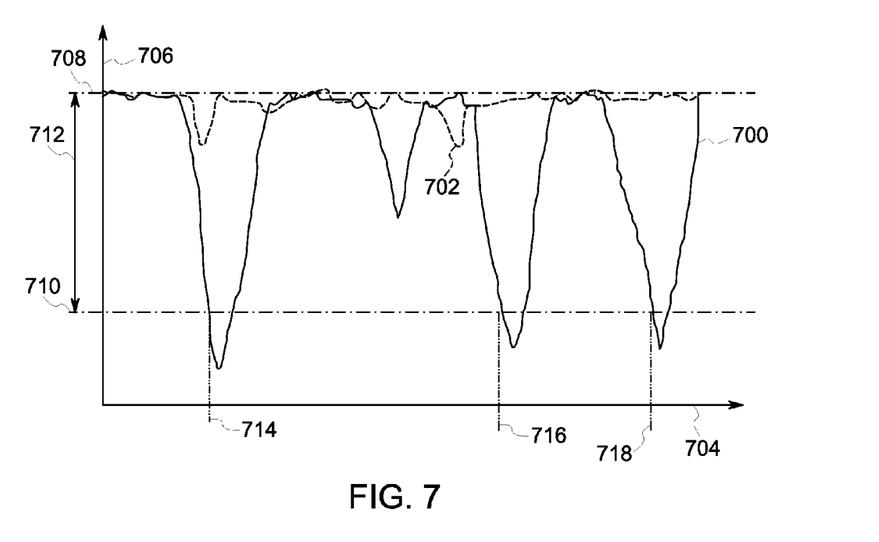
FIG. 7 illustrates statistics of the prime mover shown in FIG. 5 measured over time according to one example.

FIG. 7 illustrates statistics 700, 702 of the prime mover 524 measured over time according to one example. The statistics 700, 702 can represent averages of the output power of the prime mover 524, such as averages of the output power measured once every thirty seconds (or another frequency). The statistics 700, 702 are shown alongside a horizontal axis 704 representative of time or numbers of calculated statistics and a vertical axis 706 representative of magnitudes of the statistics (e.g., horsepower).

The statistics 700, 702 can be examined to determine if the statistics 700, 702 decrease by at least a designated amount 712 from a baseline or current value 708 to a decreased value 710 at least as often as a designated frequency. The baseline or current value 708 of the statistics 700, 702 can represent the value of the statistic calculated at 606. Alternatively, the baseline or current value 708 can represent an average or median value of the statistics 700, 702.

With respect to the statistics 700, the controller 502 can determine that the statistics 700 drop by at least the threshold amount 712 at three different times 714, 716, 718. The controller 502 can examine how frequently these times 714, 716, 718 occur to determine if the statistics 700 decrease by at least the threshold amount 712 at a rate that is greater than a designated frequency. In one aspect, the designated frequency may be once every twelve hours or another frequency. If the times 714, 716, 718 occur at least once every twelve hours or more often, then the statistics 700 may indicate that the clutch 508 is operating normally (e.g., the clutch 508 is not stuck and is able to engage and disengage as needed to activate or deactivate the load 510). For example, the decrease in statistics 700 can indicate that the output of the prime mover 524 is decreasing, which can be caused by the clutch 508 engaging with the load 510 and causing part of the engine output being used to drive the load 510. The subsequent increases in the statistics 700 indicate that the output is increasing due to the clutch 508 disengaging from the load 510 and the engine output increasing in response to no longer driving the load 510.

The controller 502 can determine that the statistics 700 decrease by at least the threshold amount 712 at least as often as a designated frequency. As a result, the controller 502 may determine that the clutch 508 is not stuck, and flow of the method 600 can return toward 604 to continue monitoring the output of the prime mover 524. Optionally, the method 600 may terminate.

On the other hand, if the statistics 700 do not decrease by at least the threshold amount 712 at a rate that is at least as often as the designated frequency, then the statistics 700 may indicate that the clutch 508 is stuck. As a result, flow of the method 600 can proceed toward 610.

With respect to the statistics 702, the controller 502 can determine that the statistics 702 do not drop by at least the threshold amount 712. As a result, the statistics 702 may indicate that the clutch 508 is stuck. A stuck clutch 508 may prevent the output of the prime mover 524 from decreasing by at least the threshold amount 712 because the stuck clutch 508 may keep the load 510 activated and powered by the prime mover 524, which prevents the output of the prime mover 524 from decreasing by at least the threshold amount 712 at least at a frequency that is at least as fast as the designated frequency. Because the statistics 702 do not decrease by at least the threshold amount 712 at a frequency that is at least as rapid as the designated frequency, flow of the method 600 can proceed toward 610.

At 610, the clutch 508 is identified as a faulty clutch. The controller 502 may determine that the clutch 508 is faulty in that the clutch 508 is stuck and is keeping the load 510 powered by the prime mover 524. At 612, one or more remedial actions are implemented. The controller 502 can generate a control signal 120 indicative of the faulty clutch. This control signal 120 may be communicated to a memory device 528 (shown in FIG. 5) of the system 500 for automatically storing information about the clutch failure. The memory device 528 can represent read only computer memory, random access computer memory, or another type of memory. Optionally, the control signal can be communicated to an output device 530 of the system 500 for automatically alerting an operator of the powered system about the clutch failure. The output device 530 can represent a display, speaker, or other device capable of communicating the information to the operator. Optionally, the control signal can be communicated to an off-board location via a communication device 532, such as transceiving circuitry (e.g., an antenna, modem, and/or associated circuitry), for automatically scheduling a maintenance operation (e.g., repair and/or inspection) on the powered system. Receipt of the control signal 120 at the remote location may optionally cause a schedule of the powered system 506 to be altered for repair and/or inspection of the clutch system 504. Optionally, the control signal can be communicated to the control unit 526 for automatically controlling the powered system from a first mode of operation to a second, different mode of operation. For example, the control unit 526 can automatically turn off down the prime mover 524 or set the throttle of the prime mover 524 to a designated setting (e.g., idle) responsive to receiving the control signal. Operation of the method 600 may return toward 604 or may terminate.

Returning to the description of 602, if the clutch 508 can be controlled, then flow of the method 600 can proceed toward 614. At 614, the engine output of the prime mover 524 is monitored to determine when the output is at or above a designated output for at least a designated time period. For example, the controller 502 can monitor power outputs of the prime mover 524 to determine once the prime mover 524 generates at least a designated power output threshold for at least a designated, non-zero time period. Responsive to the prime mover 524 producing a power output that exceeds the designated power output threshold for at least as long as the threshold time period, flow of the method 600 can proceed toward 616.

At 616, the load 510 (e.g., a radiator fan) is directed to operate at or below a lower designated output. The lower designated output may be an output that is less than the maximum possible output of the load 510. For example, if the load 510 is a fan that can operate at 2000 RPMs, then the load 510 may be directed at 616 to operate at a speed of no more than 50% of this maximum speed, or no faster than 1000 RPMs. Alternatively, another lower designated output may be used, such as 45%, 40%, 35%, or the like, of the maximum possible output. In one embodiment, the controller 502 can communicate a control signal to the load 510 to control the output of the load 510.

At 618, the engine output of the prime mover 524 is monitored. For example, the engine outputs of the prime mover 524 (e.g., the horsepower or torque generated) after directing the load 510 to operate at or below the lower designated output can be monitored and used to calculate one or more statistics, as described above.

At 620, the load 510 (e.g., a radiator fan) is directed to operate at or above a larger designated output. The larger designated output may be an output that is greater than the lower designated output. In one embodiment, the larger designated output is the maximum possible output of the load 510. Alternatively, the larger designated output may be larger than the lower designated output, but smaller than the maximum possible output of the load 510, such as 95%, 90%, 85%, 80%, or the like, of the maximum possible load. Optionally, the larger designated output may be 105%, 110%, 115%, 120%, 150%, 200%, or the like, of the lower designated output.

At 622, the engine output of the prime mover 524 is monitored. For example, the engine outputs of the prime mover 524 (e.g., the horsepower or torque generated) after directing the load 510 to operate at or above the larger designated output can be monitored and used to calculate one or more statistics, as described above.

At 624, a determination is made as to whether the engine output decreases by at least a designated amount. For example, the engine outputs monitored after the load 510 is directed to operate at or below the lower designated output can be compared with the engine outputs monitored after the load 510 is directed to operate at or above the larger designated output. If the engine outputs do not decrease by at least a designated amount (e.g., the designated amount 712 shown in FIG. 7), then the failure of the engine outputs to decrease may indicate that the clutch 508 is stuck in an engaged position. The engine outputs may not decrease because the prime mover 524 is powering the load 510 (with the clutch 508 stuck in an engaged state) even after the output of the load 510 is commanded to decrease (which would cause the clutch 508 to disengage so that the prime mover 524 no longer powers the load 510). As a result, flow of the method 600 may proceed toward 610, which is described above.

On the other hand, if the engine output does decrease by at least the threshold amount, then this change in the engine output may indicate that the clutch 508 is not stuck in an engaged position. For example, commanding the load 510 to decrease output may cause the output of the prime mover 524 to increase when the clutch 508 is not stuck in a fully engaged position. Because the prime mover 524 powers the load 510, decreasing the output of the load 510 should increase the engine output of the prime mover 524 as less of the engine output is used to power the load 510. Increasing the output of the load 510 should then cause the engine output to decrease due to more of the engine output being used to power the load 510. If the engine output does increase by at least the threshold amount, then the clutch 508 may not be stuck in an engaged position, and flow of the method 600 may return toward 614. Optionally, operation of the method 600 may terminate.

In one embodiment, a system (e.g., a system for auxiliary clutch failure detection) includes a controller configured for operable coupling with a clutch system of a powered system. The clutch system has a clutch and a load driven by the clutch. The controller is configured to determine a difference between a first output power of the powered system when the clutch system is controlled to engage and drive the load at a first output of the load and a second output power of the powered system when the clutch system is controlled to drive the load at a larger, second output. The controller is configured to generate a control signal indicative of clutch failure responsive to the difference being less than a designated threshold.

In one aspect, the clutch system is configured for the clutch to fully engage the load responsive to the clutch failure.

In one aspect, the powered system is a vehicle, the load is a radiator fan, and the clutch is a hydraulic clutch.

In one aspect, the powered system is a vehicle, and the controller is configured to determine the first output power as a first net power output of the vehicle when a throttle of the vehicle is fully applied and to determine the second output power as a second net power output of the vehicle when the throttle of the vehicle is not fully applied.

In one aspect, the controller is configured to determine the first output power of the powered system responsive to the first output power being at or above a designated, non-zero output for at least a designated, non-zero period of time.

In one aspect, the controller is configured to generate the control signal to at least one of control a memory device for automatically storing information about the clutch failure, control an output device for automatically alerting an operator of the powered system about the clutch failure, control a communication device for automatically scheduling a maintenance operation on the powered system, and/or automatically control the powered system from a first mode of operation to a second, different mode of operation.

In another embodiment, a method (e.g., for detecting auxiliary clutch failure) includes measuring a power output of an engine with a power sensor. The engine is configured to drive a load of the powered system during a time period that a clutch system is engaged with the load. The method also includes determining that the power output of the engine is at or above a designated, non-zero output for at least a designated, non-zero time period and, responsive to determining that the power output is at or above the designated, non-zero output for at least the designated, non-zero time period, monitoring the power output of the engine for one or more decreases in the power output. The method also includes identifying the clutch system as being in a failure mode responsive to the power output of the engine not decreasing by at least a designated threshold amount.

In one aspect, the method also includes generating a control signal responsive to identifying the clutch system being in the failure mode, the control signal generated to at least one of control a memory device for automatically storing information about the clutch failure, control an output device for automatically alerting an operator of the powered system about the clutch failure, control a communication device for automatically scheduling a maintenance operation on the powered system, and/or automatically control the powered system from a first mode of operation to a second, different mode of operation.

In one aspect, identifying the clutch system as being in the failure mode occurs responsive to the power output of the engine not decreasing by at least the designated threshold amount at least as often as a designated frequency.

In one aspect, identifying the clutch system as being in the failure mode does not occur responsive to the power output of the engine decreasing by at least the designated threshold amount but at a frequency that is slower than the designated frequency.

In one aspect, measuring the power output of the engine and monitoring the power output of the engine both include calculating a statistic of the power output. The statistic can include an average of samples of the power output of the engine.

In another embodiment, another method (e.g., for detecting failure of an auxiliary clutch fan) includes directing a load of a powered system to operate at or below a first designated output. The powered system includes an engine configured to drive the load during a time period that a clutch system of the powered system is engaged with the load. The method also includes measuring a power output of the engine with a power sensor while the load is operating at or below the first designated output, directing the load of the powered system to operate at or above a larger, second designated output, measuring the power output of the engine while the load is operating at or above the second designated output, and identifying the clutch system as being in a failure mode based on a difference between the power output of the engine during operation of the load at or below the first designated output and the power output of the engine during operation of the load at or above the second designated output.

In one aspect, the method also includes determining that the power output of the engine is at or above a designated, non-zero output for at least a designated, non-zero time period prior to directing the load of the powered system to operate at or below the first designated output.

In one aspect, identifying the clutch system as being in the failure mode occurs responsive to the difference exceeding a designated, non-zero threshold amount.

In one aspect, identifying the clutch system as being in the failure mode occurs responsive to the difference including a decrease from the power output of the engine while the load is operating at or below the first designated output to the power output of the engine while the load is operating at or above the second designated output.

In one aspect, one or more of measuring the power output of the engine while the load is operating at or below the first designated output or measuring the power output of the engine while the load is operating at or above the second designated output includes calculating a statistic of the power output. The statistic includes an average of samples of the power output of the engine.

In one aspect, the method also includes generating a control signal responsive to identifying the clutch system being in the failure mode. The control signal can be generated to control a memory device for automatically storing information about the clutch failure.

In one aspect, the method also includes generating a control signal responsive to identifying the clutch system being in the failure mode. The control signal can be generated to control a communication device for automatically scheduling a maintenance operation on the powered system.

In one aspect, the method also includes generating a control signal responsive to identifying the clutch system being in the failure mode. The control signal can be generated to automatically control the powered system from a first mode of operation to a second, different mode of operation.

In one aspect, the method also includes generating a control signal responsive to identifying the clutch system being in the failure mode. The control signal can be generated to control an output device for automatically alerting an operator of the powered system about the clutch failure.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the disclosed subject matter without departing from its scope. While the dimensions and types of materials described herein are intended to define the parameters of the disclosed subject matter, they are by no means limiting and are exemplary embodiments. The scope of the described subject matter should, therefore, be determined with reference to the appended claims, along with the full scope of equivalents to which such claims are entitled. In the appended claims, the terms "including" and "in which" are used as the plain-language equivalents of the respective terms "comprising" and "wherein." Moreover, in the following claims, the terms "first," "second," and "third," etc. are used merely as labels, and are not intended to impose numerical requirements on their objects.

The embodiments described herein are examples of systems, structures and methods having elements corresponding to the elements of the invention recited in the claims. This written description may enable those of ordinary skill in the art to make and use embodiments having alternative elements that likewise correspond to the elements of the invention recited in the claims. The scope of the invention thus includes structures, systems and methods that do not differ from the literal language of the claims, and further includes other systems, structures and methods with insubstantial differences from the literal language of the claims. While only certain features and embodiments have been illustrated and described herein, many modifications and changes may occur to one of ordinary skill in the relevant art. The appended claims cover all such modifications and changes.

What is claimed is:

1. A system comprising:
a controller configured for operable coupling with a clutch system of a powered system, the clutch system having a clutch and a load driven by the clutch, wherein the controller is further configured to determine a difference between a first output power of the powered system when the clutch system is controlled to engage and drive the load at a first output of the load and a second output power of the powered system when the clutch system is controlled to drive the load at a larger, second output, and wherein the controller is configured to generate a control signal indicative of clutch failure responsive to the difference being less than a designated threshold.

2. The system of claim 1, wherein the clutch system is configured for the clutch to fully engage the load responsive to the clutch failure.

3. The system of claim 1, wherein the powered system is a vehicle, the load is a radiator fan, and the clutch is a hydraulic clutch.

4. The system of claim 1, wherein the powered system is a vehicle, and the controller is configured to determine the first output power as a first net power output of the vehicle when a throttle of the vehicle is fully applied and to determine the second output power as a second net power output of the vehicle when the throttle of the vehicle is not fully applied.

5. The system of claim 1, wherein the controller is configured to determine the first output power of the powered system responsive to the first output power being at or above a designated, non-zero output for at least a designated, non-zero period of time.

6. The system of claim 1, wherein the controller is configured to generate the control signal to at least one of control a memory device for automatically storing information about the clutch failure, control an output device for automatically alerting an operator of the powered system about the clutch failure, control a communication device for automatically scheduling a maintenance operation on the powered system, or automatically control the powered system from a first mode of operation to a second, different mode of operation.

7. A method comprising:
measuring a power output of an engine with a power sensor, the engine configured to drive a load of a powered system during a time period that a clutch system is engaged with the load;
determining that the power output of the engine is at or above a designated, non-zero output for at least a designated, non-zero time period;
responsive to determining that the power output is at or above the designated, non-zero output for at least the designated, non-zero time period, monitoring the power output of the engine for one or more decreases in the power output; and
identifying the clutch system as being in a failure mode responsive to the power output of the engine not decreasing by at least a designated threshold amount.

8. The method of claim 7, further comprising generating a control signal responsive to identifying the clutch system being in the failure mode, the control signal generated to at least one of control a memory device for automatically storing information about the clutch failure, control an output device for automatically alerting an operator of the powered system about the clutch failure, control a communication device for automatically scheduling a maintenance operation on the powered system, or automatically control the powered system from a first mode of operation to a second, different mode of operation.

9. The method of claim 7, wherein identifying the clutch system as being in the failure mode occurs responsive to the power output of the engine not decreasing by at least the designated threshold amount at least as often as a designated frequency.

10. The method of claim 9, wherein identifying the clutch system as being in the failure mode does not occur responsive to the power output of the engine decreasing by at least the designated threshold amount but at a frequency that is slower than the designated frequency.

11. The method of claim 7, wherein measuring the power output of the engine and monitoring the power output of the engine both include calculating a statistic of the power output, the statistic including an average of samples of the power output of the engine.

12. A method comprising:
directing a load of a powered system to operate at or below a first designated output, the powered system including an engine configured to drive the load during a time period that a clutch system of the powered system is engaged with the load;
measuring a power output of the engine with a power sensor while the load is operating at or below the first designated output;
directing the load of the powered system to operate at or above a larger, second designated output;
measuring the power output of the engine while the load is operating at or above the second designated output; and
identifying the clutch system as being in a failure mode based on a difference between the power output of the engine during operation of the load at or below the first designated output and the power output of the engine during operation of the load at or above the second designated output.

13. The method of claim 12, further comprising determining that the power output of the engine is at or above a designated, non-zero output for at least a designated, non-zero time period prior to directing the load of the powered system to operate at or below the first designated output.

14. The method of claim 12, wherein identifying the clutch system as being in the failure mode occurs responsive to the difference exceeding a designated, non-zero threshold amount.

15. The method of claim 14, wherein identifying the clutch system as being in the failure mode occurs responsive to the difference including a decrease from the power output of the engine while the load is operating at or below the first designated output to the power output of the engine while the load is operating at or above the second designated output.

16. The method of claim 12, wherein one or more of measuring the power output of the engine while the load is operating at or below the first designated output or measuring the power output of the engine while the load is operating at or above the second designated output includes calculating a statistic of the power output, the statistic including an average of samples of the power output of the engine.

17. The method of claim 12, further comprising generating a control signal responsive to identifying the clutch system being in the failure mode, the control signal generated to control a memory device for automatically storing information about the clutch failure.

18. The method of claim 12, further comprising generating a control signal responsive to identifying the clutch system being in the failure mode, the control signal generated to control a communication device for automatically scheduling a maintenance operation on the powered system.

19. The method of claim 12, further comprising generating a control signal responsive to identifying the clutch system being in the failure mode, the control signal generated to automatically control the powered system from a first mode of operation to a second, different mode of operation.

20. The method of claim 12, further comprising generating a control signal responsive to identifying the clutch system being in the failure mode, the control signal generated to control an output device for automatically alerting an operator of the powered system about the clutch failure.

* * * * *